UNITED STATES PATENT OFFICE.

GEORGE G. NOAH, OF CHARLESTOWN, MASSACHUSETTS.

IMPROVEMENT IN PRESERVING AND MAKING PASTES.

Specification forming part of Letters Patent No. 127,097, dated May 21, 1872.

*To all whom it may concern:*

Be it known that I, GEORGE G. NOAH, of Charlestown, in the county of Middlesex and State of Massachusetts, have invented certain new and useful Improvements in Composition for Paste; and do hereby declare the following to be a full, clear, and exact description thereof.

The nature of my invention consists in the addition of certain ingredients to the common article of flour-paste for the purpose of preserving the same for any length of time, giving it greater adhesive power, as well as a more agreeable odor; and also, bleaching it so that a darker inferior quality of flour may be used without injuring the quality of the paste.

I take wheat-flour, one hundred pounds; alum, five pounds; sulphite of lime, eight ounces; and oil of sassafras, two ounces. The alum is first dissolved in hot water before putting it in.

These ingredients are mixed with cold water in such proportions as to make the paste of proper consistency when cooked by steam or otherwise.

The essential oil is necessary to prevent the growth of fungi or mold on the paste, and the sulphite of lime to prevent the fermentation or souring of the paste.

This paste will keep almost any length of time, is of very light color, and possesses no poisonous qualities.

I do not wish to confine myself to the exact proportions of the ingredients herein mentioned, as they may be varied; neither do I wish to confine myself to the specific essential oil mentioned, as that may also be varied.

Having thus fully described my invention, what I claim as new, and desire to secure by Letters Patent, is—

The within described paste, consisting of flour, alum, sulphite of lime, and essential oil, substantially as herein set forth.

GEORGE G. NOAH.

Witnesses:
B. C. MOULTON,
A. H. SKILTON.